US012794934B2

(12) United States Patent
Li et al.

(10) Patent No.: US 12,794,934 B2
(45) Date of Patent: Nov. 10, 2026

(54) SYSTEMS AND METHODS FOR HEIGHTENED DATA SECURITY VIA ARTIFICIAL INTELLIGENCE-ENHANCED ELECTRONIC MESSAGE THREAT DETECTION

(71) Applicant: BANK OF AMERICA CORPORATION, Charlotte, NC (US)

(72) Inventors: Siyuan Li, Naperville, IL (US); Michael Jacob Richardson, Northbrook, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 67 days.

(21) Appl. No.: 19/062,267

(22) Filed: Feb. 25, 2025

(65) Prior Publication Data

US 2026/0254844 A1 Aug. 27, 2026

(51) Int. Cl.

| | |
|---|---|
| ***H04L 9/40*** | (2022.01) |
| ***H04L 41/16*** | (2022.01) |
| ***H04L 51/212*** | (2022.01) |

(52) U.S. Cl.

CPC .......... *H04L 63/1441* (2013.01); *H04L 41/16* (2013.01); *H04L 51/212* (2022.05)

(58) Field of Classification Search

CPC .... H04L 63/1441; H04L 51/212; H04L 41/16
USPC ........................................................... 726/23
See application file for complete search history.

(56) References Cited

U.S. PATENT DOCUMENTS

| | | | | |
|---|---|---|---|---|
| 8,839,369 | B1 | 9/2014 | Dai et al. | |
| 10,404,745 | B2 | 9/2019 | Verma et al. | |
| 10,659,493 | B2 * | 5/2020 | Hager | H04L 63/1416 |
| 10,958,683 | B2 * | 3/2021 | Govardhan | G06V 30/153 |
| 11,310,257 | B2 * | 4/2022 | Argoeti | G06F 7/556 |
| 11,470,029 | B2 * | 10/2022 | Ryan | H04L 63/145 |
| 11,757,914 | B1 * | 9/2023 | Jakobsson | H04L 51/18 726/25 |
| 11,882,152 | B2 | 1/2024 | Kurrasch et al. | |
| 12,003,535 | B2 * | 6/2024 | Stokes, III | G06F 21/554 |

(Continued)

FOREIGN PATENT DOCUMENTS

| | | | |
|---|---|---|---|
| CN | 112948725 | A | 6/2021 |
| CN | 115757992 | A | 3/2023 |
| CN | 118445802 | A | 8/2024 |

*Primary Examiner* — Amare F Tabor

(74) *Attorney, Agent, or Firm* — Moore & Van Allen PLLC; Vincent J. Dowling

(57) ABSTRACT

Systems, computer program products, and methods are described herein for heightened data security via artificial intelligence (AI)-enhanced electronic message threat detection. Embodiments of the present disclosure are configured to receive an electronic message including a plurality of data elements, analyze the plurality of data elements to generate a first set of contextual data, generate a threat level of the electronic message, identify, if the threat level is below a threshold, one or more data elements of the plurality of data elements associated with a uniform resource locator, simulate the URL in an isolated environment to obtain a URL simulation, compare the URL simulation to the first set of contextual data to determine if the URL simulation matches the first set of contextual data, and block, if the URL simulation does not match the first set of contextual data, transmission of the electronic message to a user.

20 Claims, 11 Drawing Sheets

(56) References Cited

U.S. PATENT DOCUMENTS

| | | | |
|---|---|---|---|
| 12,231,464 | B2 | 2/2025 | Azarafrooz et al. |
| 2004/0260776 | A1 | 12/2004 | Starbuck et al. |
| 2007/0094500 | A1 | 4/2007 | Shannon et al. |
| 2010/0205123 | A1 | 8/2010 | Sculley et al. |
| 2022/0094713 | A1 | 3/2022 | Lee et al. |
| 2022/0279014 | A1 | 9/2022 | Stokes, III et al. |
| 2023/0038671 | A1 | 2/2023 | Weber et al. |
| 2024/0297900 | A1 | 9/2024 | Stokes, III et al. |
| 2025/0039218 | A1 | 1/2025 | Mcclurg |
| 2025/0088533 | A1 | 3/2025 | Locar et al. |
| 2025/0373657 | A1 * | 12/2025 | Maghrabi ........... H04L 63/1483 |

* cited by examiner

SYSTEMS AND METHODS FOR HEIGHTENED DATA SECURITY VIA ARTIFICIAL INTELLIGENCE-ENHANCED ELECTRONIC MESSAGE THREAT DETECTION

FIELD OF THE INVENTION

The present invention embraces a system for heightened data security via artificial intelligence (AI)-enhanced electronic message threat detection.

BACKGROUND

Presently, methods of social engineering penetration testing (e.g., sending "fake" deceptive electronic messages to evaluate end-user responses) have proven inadequate for addressing modern cybersecurity threats. Relying solely on user cognitive ability to identify malicious content is flawed and inconsistent. Therefore, there is a need for systems and/or methods of effective cyber protection not dependent on end-users making the "best choice" in high-stakes scenarios.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for heightened data security via AI-enhanced electronic message threat detection may include a network interface configured to communicate via a communication network, at least one non-transitory storage device including computer program code stored thereon, and at least one processing device operably coupled to the network interface and the at least one non-transitory storage device. In some embodiments, the computer program code may include computer instructions configured to cause the processing device to receive, via the network interface, an electronic message including a plurality of data elements, analyze, via an artificial intelligence (AI) model, the plurality of data elements to generate a first set of contextual data, generate, via the first set of contextual data, a threat level of the electronic message, identify, if the threat level is below a threshold, one or more data elements of the plurality of data elements associated with a uniform resource locator (URL), simulate the URL in an isolated environment to obtain a URL simulation, compare the URL simulation to the first set of contextual data to determine if the URL simulation matches the first set of contextual data, and block, if the URL simulation does not match the first set of contextual data, transmission of the electronic message to a user.

In some embodiments, the at least one non-transitory storage device may include computer-executable program code that, when executed by the at least one processing device, causes the at least one processing device to, prior to blocking the transmission of the electronic message, transmit, via the network interface, a notification including a summary of the first set of contextual data and the URL to the user and allow the transmission of the electronic message to the user. Additionally, or alternatively, a database may be configured to store data associated with the analysis of the AI model and data associated with user interactions with the electronic message.

In some embodiments, the AI model and the isolated environment may be stored locally and integrated in one or more electronic message platforms. Additionally, or alternatively, the at least one non-transitory storage device may include computer-executable program code that, when executed by the at least one processing device, causes the at least one processing device to, when simulating the URL, execute the URL in the isolated environment to simulate the URL, generate a second set of contextual data associated with the URL, and transmit the second set of contextual data to the AI model. Further, the at least one non-transitory storage device may include computer-executable program code that, when executed by the at least one processing device, causes the at least one processing device to, when comparing the URL simulation to the first set of contextual data, compare, via the AI model, the first set of contextual data with the second set of contextual data to generate a match measurement and determine to block the electronic message if the match measurement is below a threshold.

In some embodiments, the at least one non-transitory storage device may include computer-executable program code that, when executed by the at least one processing device, causes the at least one processing device to cause a user device to display an interactable environment, receive a user interaction with the interactable environment to opt out of electronic message blocking, after receiving the user interaction, receive, via the network interface, another electronic message, and allow, based on the user interaction, transmission of the other electronic message.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
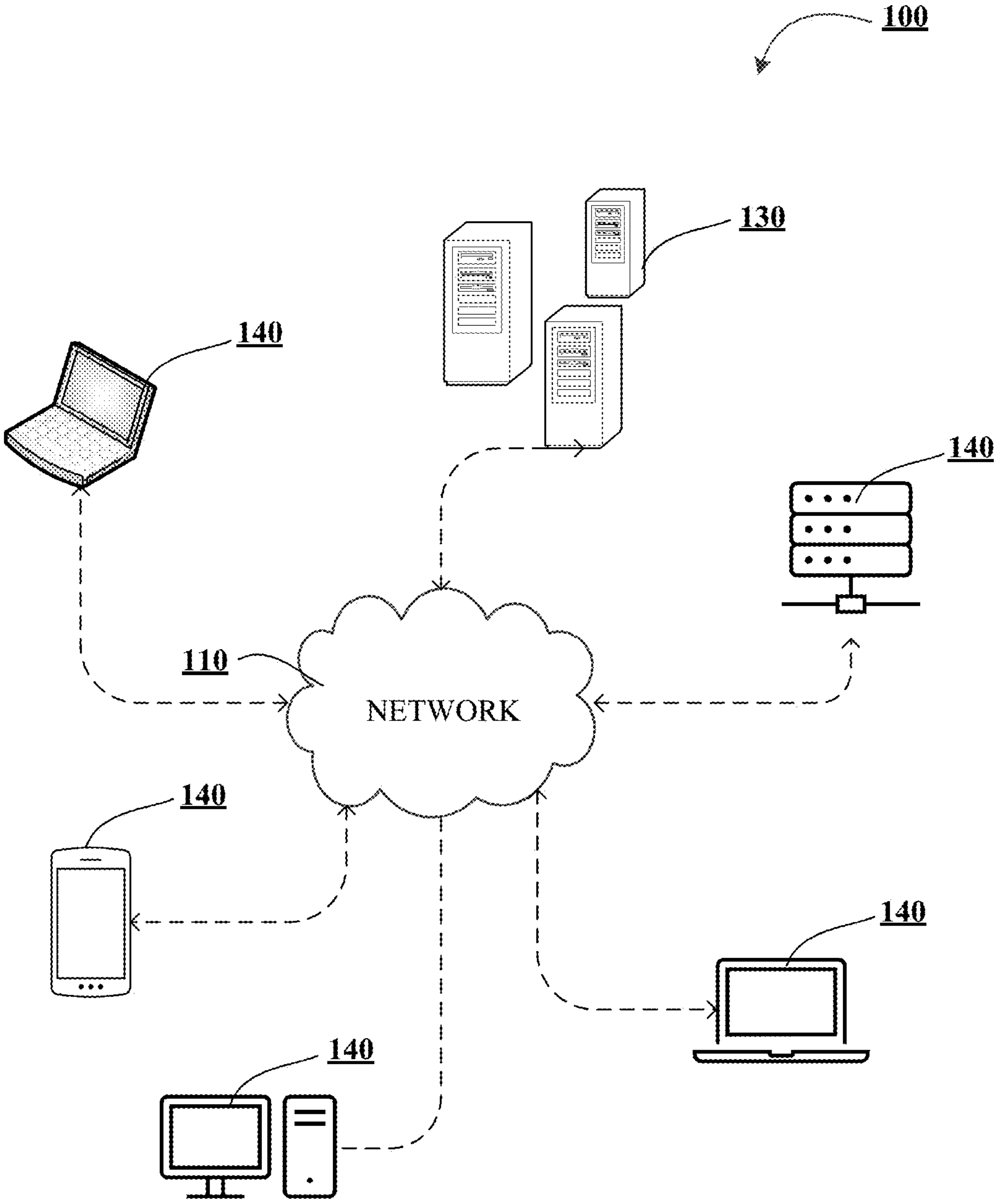
Figure 1B:
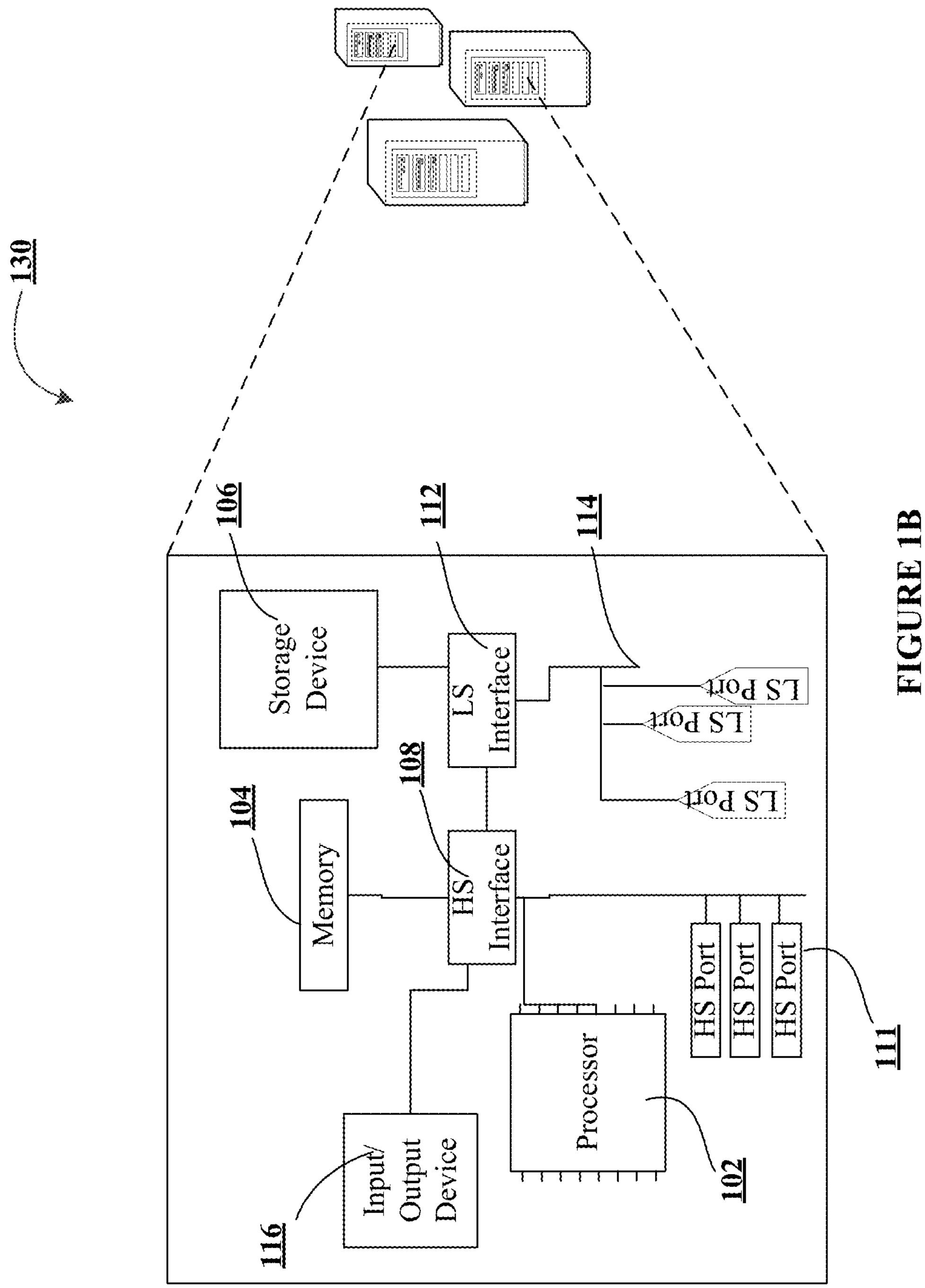
Figure 1C:
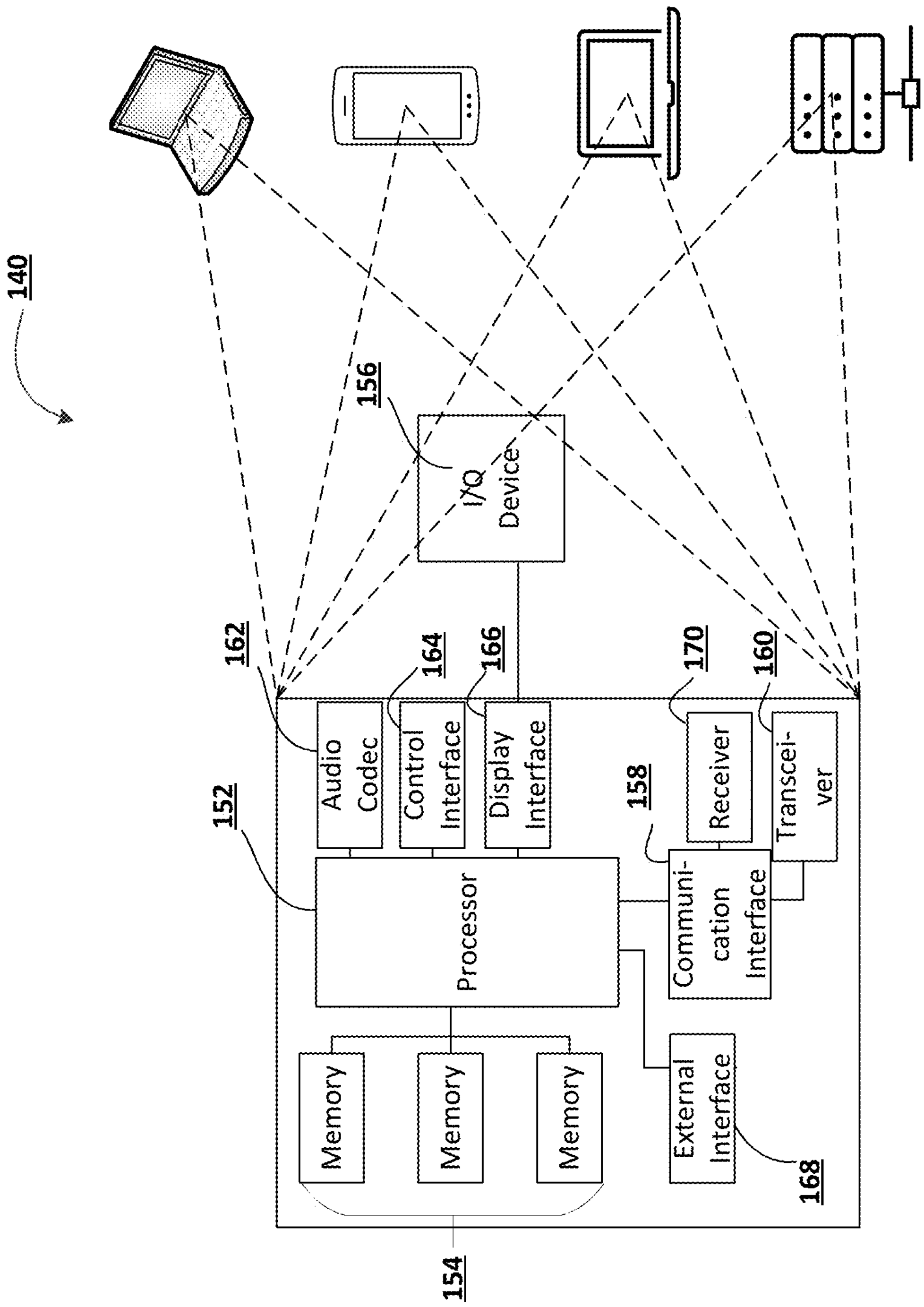
Figure 2:
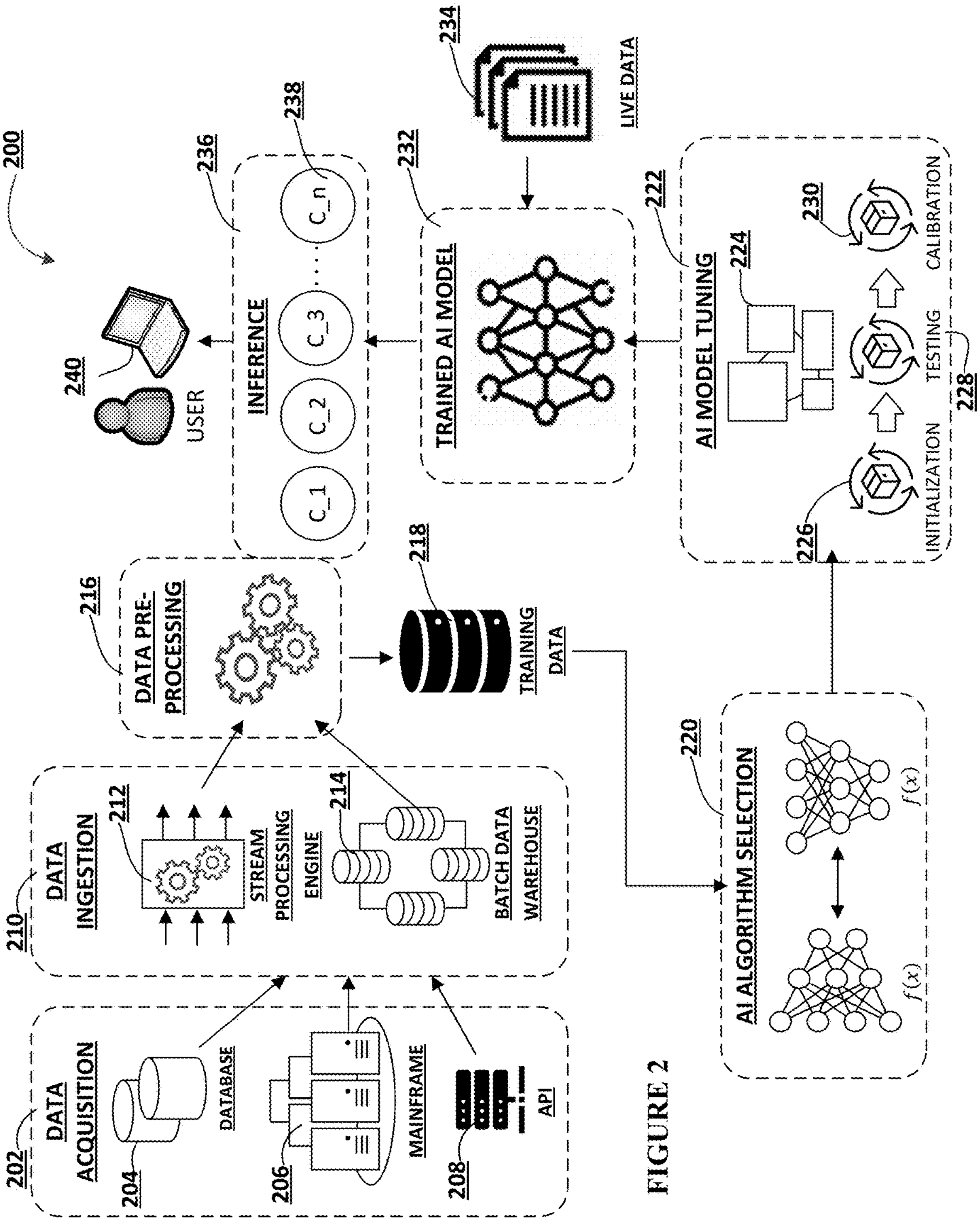
Figure 3:
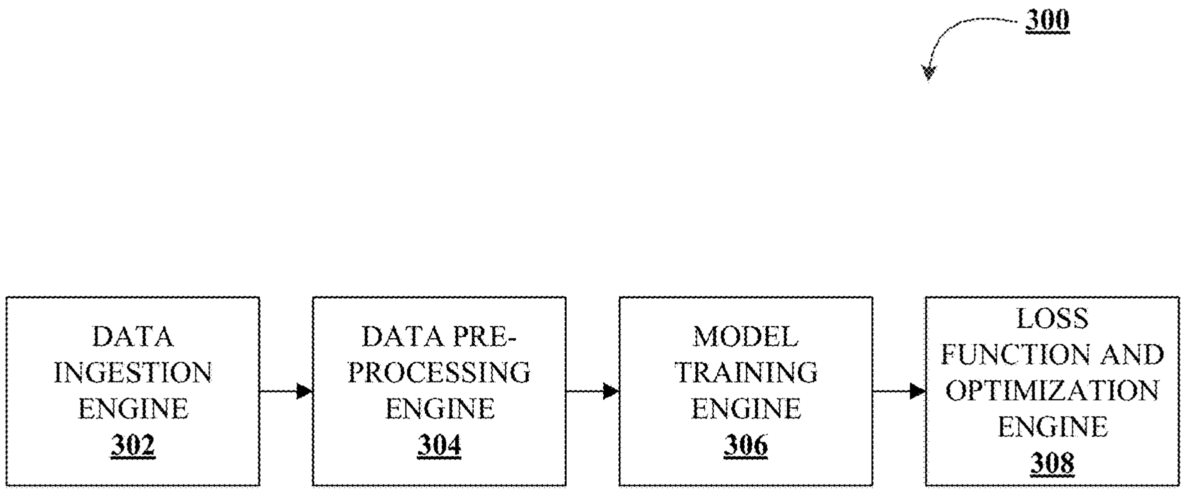
Figure 4:
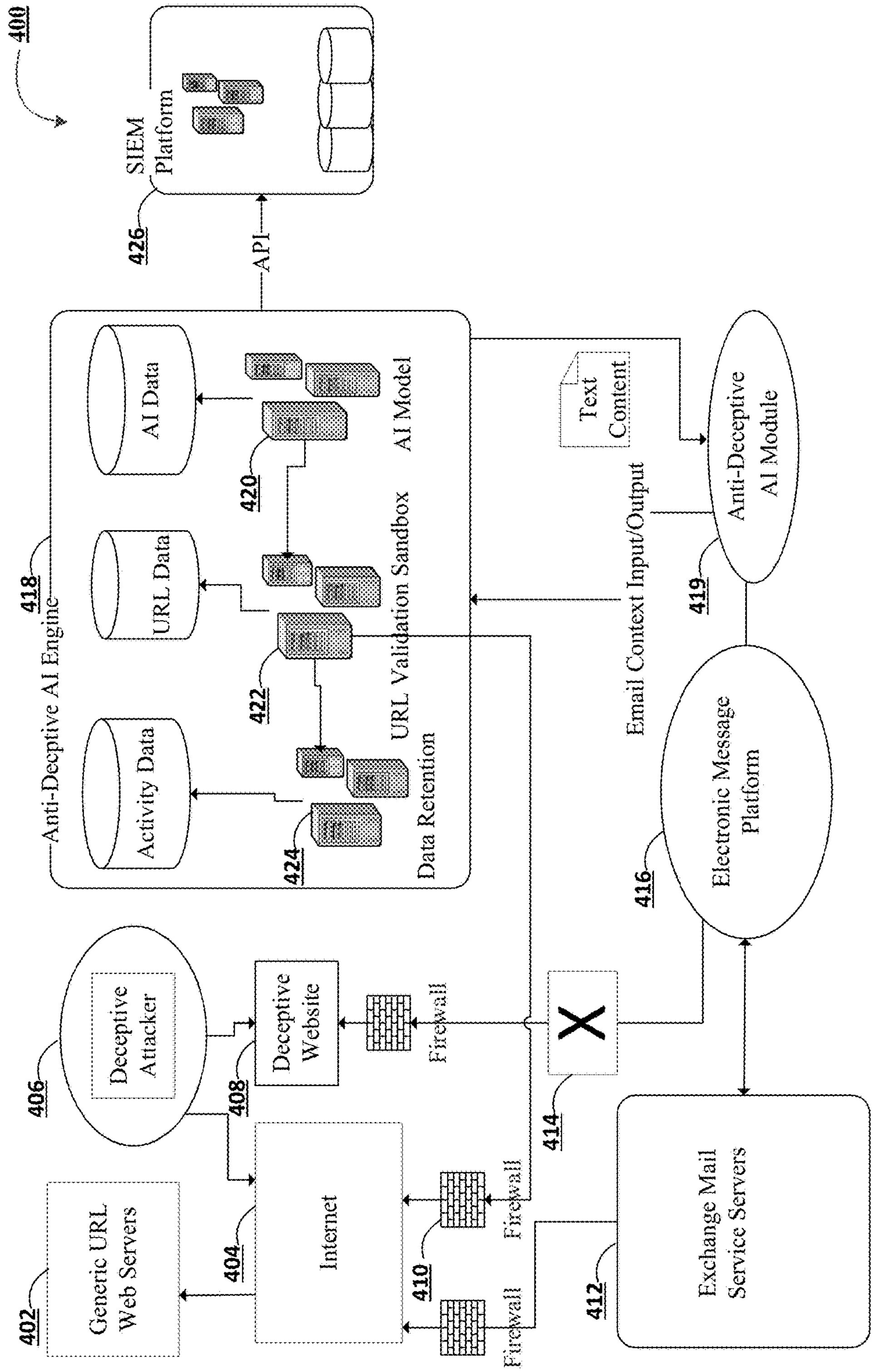
Figure 5:
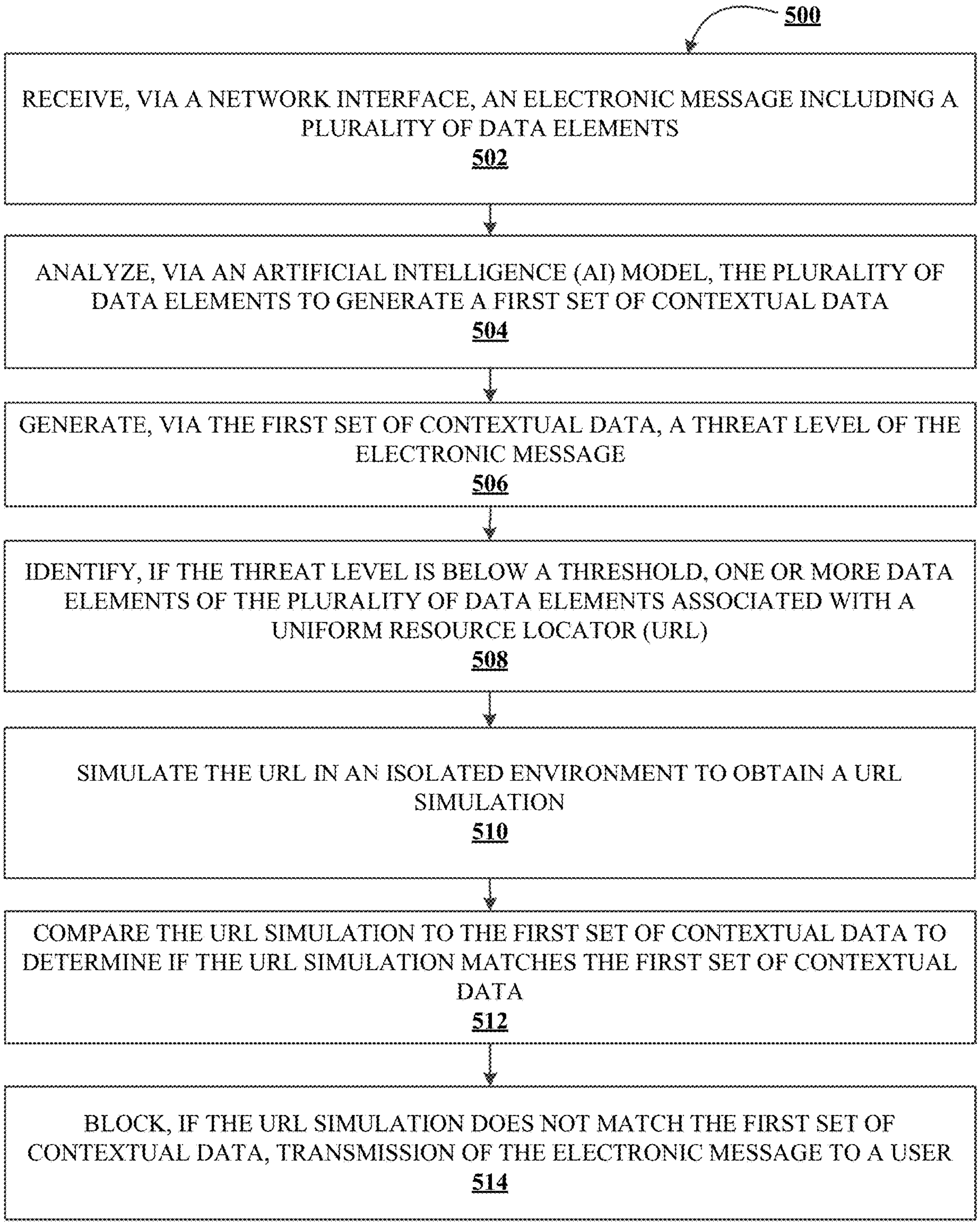
Figure 6:
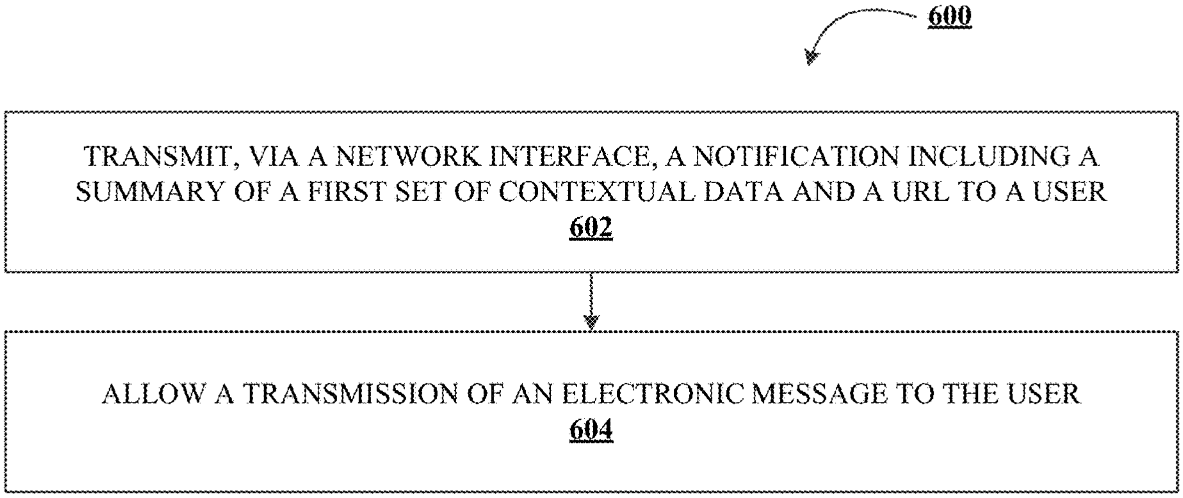
Figure 7:
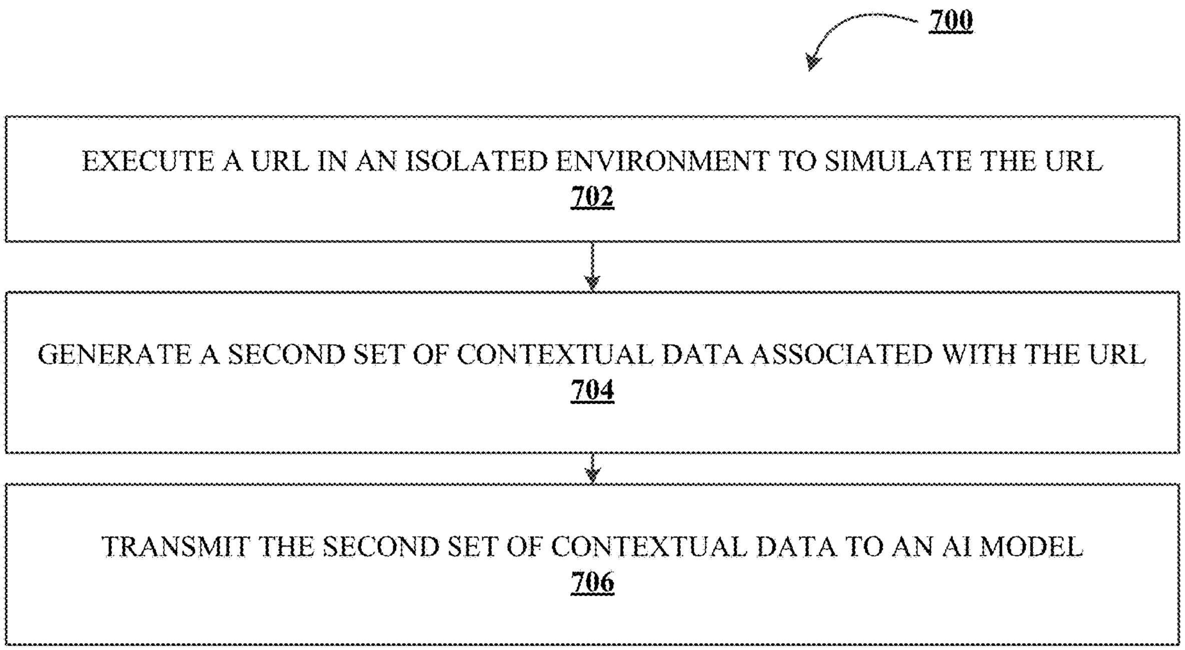
Figure 8:
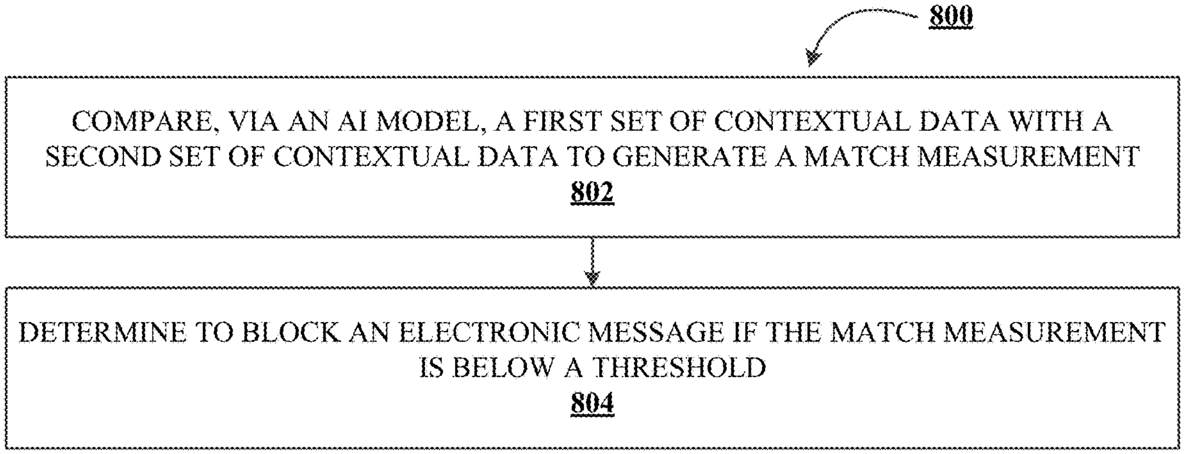
Figure 9:
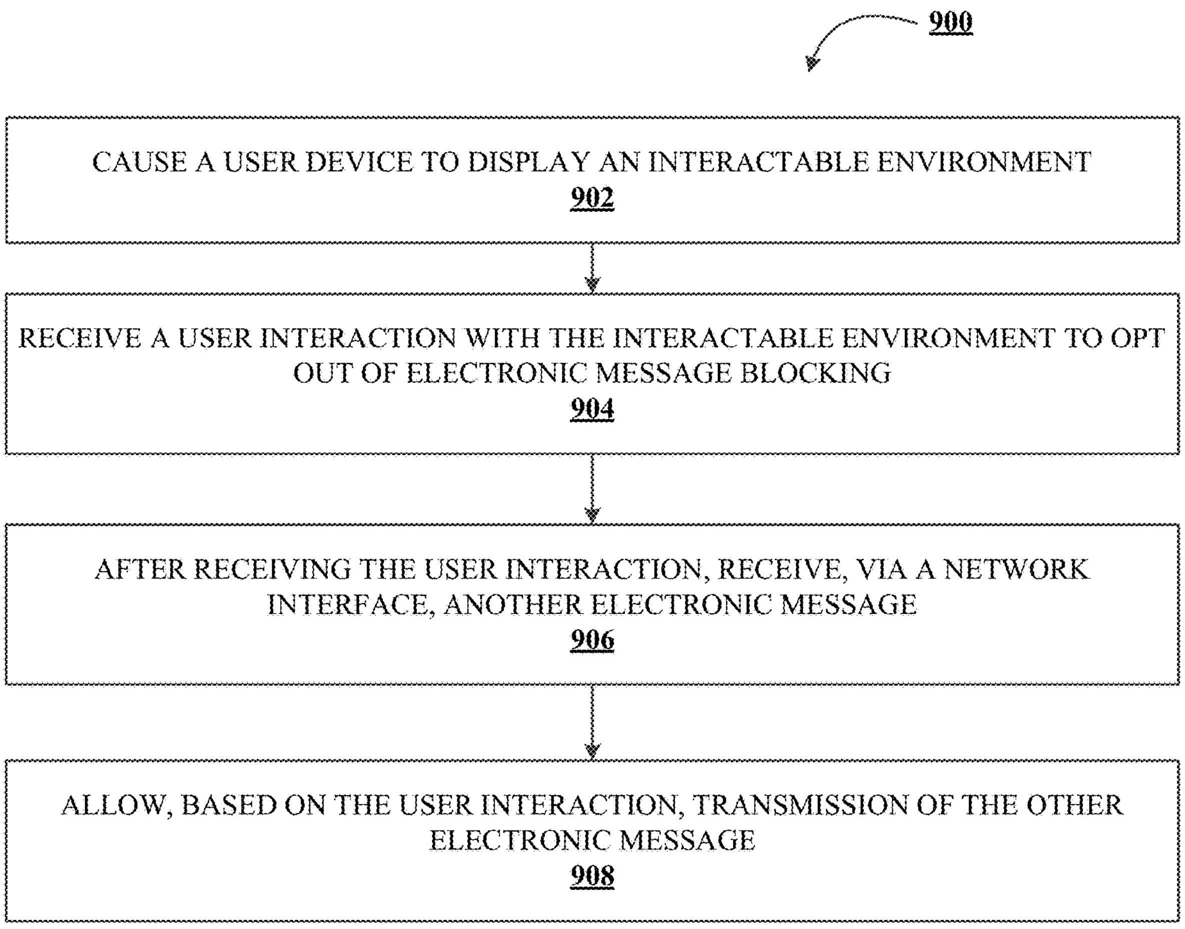

Having thus described embodiments of the invention in general terms, reference will now be made the accompanying drawings, wherein:

FIGS. 1A-1C illustrate technical components of an exemplary distributed computing environment for heightened data security via AI-enhanced electronic message threat detection, in accordance with an embodiment of the disclosure;

FIG. 2 illustrates an exemplary AI engine subsystem architecture, in accordance with an embodiment of the disclosure;

FIG. 3 illustrates an exemplary generative AI subsystem, in accordance with an embodiment of the disclosure;

FIG. 4 illustrates a flowchart for heightened data security via AI-enhanced electronic message threat detection, in accordance with an embodiment of the disclosure;

FIG. 5 illustrates a process flow for heightened data security via AI-enhanced electronic message threat detection, in accordance with an embodiment of the disclosure;

FIG. 6 illustrates another process flow for heightened data security via AI-enhanced electronic message threat detection, in accordance with an embodiment of the disclosure;

FIG. 7 illustrates another process flow for heightened data security via AI-enhanced electronic message threat detection, in accordance with an embodiment of the disclosure;

FIG. 8 illustrates another process flow for heightened data security via AI-enhanced electronic message threat detection, in accordance with an embodiment of the disclosure; and FIG. 9 illustrates another process flow for heightened data security via AI-enhanced electronic message threat detection, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, and/or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning of, for example, distal phalanges, intermediate phalanges, proximal phalanges, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, and/or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, and/or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and/or the like.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource distribution," or "resource allocation" may refer to any transaction, activities, and/or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer", a "transaction", a "transaction event", or a "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and/or the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As used herein, "data element" may refer to a single unit of information and/or of data within a datafile, database, dataset, document, image, PDF, and/or the like. The data element may represent a specific value and/or piece of data that is stored and/or processed. In other words, a data element may represent any individual piece of data within a structured collection of information. For example, in a spreadsheet, a data element may be a value in a single cell. In a database, a data element may be a specific field in a record. In a CSV file, data elements may be separated by commas and may include values such as "Product Name," "Price," or "User Address." In an image, a data element may be a single pixel of the image and/or a collection of pixels representing a section of the image. In a datafile, a data element may be described as a single unit or piece of information that is stored within the datafile. The data element may represent a specific attribute or value related to the datafile's overall purpose. Each data element may be structured to hold a particular type of information (e.g., a number, text, a date, code, and/or the like). These elements are the building blocks of the datafile, working together to form a complete set of information that can be processed, analyzed, or stored.

The present disclosure may include a system, computer program, and/or method for heightened data security via artificial intelligence-enhanced electronic message threat detection. Presently, methods of social engineering penetration testing (e.g., sending "fake" deceptive emails to evaluate end-user responses) have proven inadequate for addressing modern cybersecurity threats. Relying solely on user cognitive ability to identify malicious content is flawed and inconsistent. Therefore, there is a need for systems and/or methods of effective cyber protection not dependent on end-users making the "best choice" in high-stakes scenarios Embodiments of the present disclosure, unlike traditional tools, leverage AI methods (e.g., natural language processing (NLP)) for input validation and/or content behavior analysis to evaluate the intent and context of electronic messages and/or embedded links (e.g., URLs). Further, embodiments of the present disclosure provide real-time feedback on the authenticity of embedded link and ensure seamless integration with existing electronic message platforms (e.g., Outlook).

In some embodiments, a system for heightened data security via AI-enhanced electronic message threat detection may use advanced NLP to comprehend a purpose of an electronic message, intent of the sender, and/or content surrounding embedded links (e.g., contextual analysis). Additionally, or alternatively, the system may validate whether embedded links redirect to a legitimate entity website or a malicious website mimicking an authentic URL (e.g., URL validation). Further, the system may differentiate between entity internal or external websites to flag potential threats. In some embodiments, shortened URLs (e.g., via placeholders) may be analyzed in a sandbox environment to uncover the original destination and identify threats.

Embodiments of the present disclosure may offer a plurality of operations modes for user-interaction levels to balance security and usability. In some embodiments, the system may operate in a fully automated mode where electronic messages including content with a high threat level and/or malicious URLs may be automatically deleted to prevent user interaction. Additionally, or alternatively, the system may operate in a semi-automated mode where users may be notified of an email including content with a high threat level and/or malicious URL. In such embodiments, the user may choose to proceed with viewing and/or interacting with the electronic message or to block the electronic message. Additionally, or alternatively, the system may be turned off by the user.

In some embodiments, the system may integrate with one or more electronic message platforms (e.g., as an add-on for mainstream electronic message applications such as Microsoft Outlook). In such embodiments, the system may operate in the background as a silent startup service, continuously scanning electronic messages for content with a high threat level and/or malicious URLs. In some embodiments, the system may include data logging and integration. In such embodiments, user interactions with flagged electronic messages and/or URLs may be captured and stored in a database (e.g., a central repository) for audit trails and data retention. Further, APIs may be provided for seamless integration with security information and event management (SIEM) tools (e.g., Splunk, ServiceNow, and/or the like) for advanced analysis.

Accordingly, the present invention includes a system, computer program, and method for heightened data security via artificial intelligence-enhanced electronic message threat detection. Embodiments of the present disclosure may be configured to receive an electronic message including a plurality of data elements, analyze, via an artificial intelligence (AI) model (e.g., a subsystem of an anti-deceptive AI engine), the plurality of data elements to generate a first set of contextual data (e.g., the AI model processes the body of the electronic message and learns the content of the electronic message and/or what the electronic message is directed to), generate, via the first set of contextual data, a threat level of the electronic message (e.g., how likely is it that the electronic message is a deceptive electronic message, a spam electronic message, and/or the like), and identify, if the threat level is below a threshold (e.g., the AI model may determine, from the body of the electronic message alone, that the electronic message is a deceptive electronic message, but, in some cases, it may not be certain the electronic message is a deceptive electronic message), one or more data elements of the plurality of data elements associated with a uniform resource locator (URL) (e.g., the AI model finds a URL in the body of the electronic message).

Additionally, embodiments of the present disclosure may be configured to simulate the URL in an isolated environment to obtain a URL simulation (e.g., the anti-deceptive AI engine expands the URL, if it is shortened, and/or executes the URL in a sandbox environment to determine context of the information contained on a webpage associated with the URL), compare the URL simulation to the first set of contextual data to determine if the URL simulation matches the first set of contextual data (e.g., the body of the electronic message may claim to be directed to a subject and/or associated with a specific entity, but the webpage associated with the URL may be directed to a different subject and/or not the claimed entity), and block, if the URL simulation does not match the first set of contextual data, transmission of the electronic message to a user.

What is more, the present invention provides a technical solution to a technical problem. As described herein, the technical problem includes identifying electronic messages including content associated with a high threat level and/or content that may be a data security threat. The technical solution presented herein allows for a system to receive an electronic message, analyze the electronic message, generate a threat level of the electronic message, identify a uniform resource locator, simulate the URL in an isolated environment, compare the URL context to the electronic message context, and block, if the URL context does not match the electronic message context, transmission of the electronic message to a user. In particular, heightened data security via AI-enhanced electronic message threat detection is an improvement over existing solutions to identifying electronic messages including content associated with a high threat level and/or content that may be a data security threat, (i) with fewer steps to achieve the solution, thus reducing the amount of computing resources, such as processing resources, storage resources, network resources, and/or the like, that are being used (e.g., by using a single system to analyze electronic messages and any embedded links included, the amount of steps required interfacing between different systems, users, and/or the like to review and block malicious electronic messages are reduced), (ii) providing a more accurate solution to the problem, thus reducing the number of resources required to remedy any errors made due to a less accurate solution (e.g., by using an anti-deceptive AI engine, electronic messages including content with a high threat level and/or malicious URLs may be positively identified in real-time reducing resources spent remedying negative results of users interacting with said electronic messages), (iii) removing manual input and waste from the implementation of the solution, thus improving speed and efficiency of the process and conserving computing resources (e.g., by using an anti-deceptive AI engine, manual review of electronic messages and/or manual corrections of issues caused by interactions with malicious electronic messages is eliminated, thus increasing the speed and efficiency of blocking malicious electronic messages and reducing exposure to malicious electronic messages), and (iv) determining an optimal amount of resources that need to be used to implement the solution, thus reducing network traffic and load on existing computing resources (e.g., by analyzing text bodies of electronic messages prior to analyzing embedded links in electronic messages, electronic messages with text bodies that are easy to determine are malicious may be blocked without spending further computing resources on analyzing additional elements of the electronic messages). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for heightened data security via AI-enhanced electronic message threat detection, in accordance with an embodiment of the invention. As shown in FIG. 1A, the distributed computing environment 100 contemplated herein may include a system 130 (i.e., a system for heightened data security via AI-enhanced electronic message threat detection), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. In some embodiments, the AI engine subsystem 200 may be included in a system (e.g., similar to the system 130 shown and described herein with respect to FIGS. 1A-1C). Additionally, or alternatively, the AI engine subsystem 200 may be a subsystem of another system (e.g., similar to the system 130 shown and described herein with respect to FIGS. 1A-1C) that is in communication with a system for heightened data security via AI-enhanced electronic message threat detection (e.g., via a network similar to the network 110 as shown and described herein with respect to FIGS. 1A-1C). Further, the AI engine subsystem 200 may be a subsystem of another system (e.g., similar to the system 130 shown and described herein with respect to FIGS. 1A-1C) that is in communication with (e.g., via a network similar to the network 110 as shown and described herein with respect to FIGS. 1A-1C) a generative AI subsystem (e.g., similar to the generative AI subsystem 300 as shown and described herein with respect to FIG. 3. The AI engine subsystem 200 may include a data acquisition engine 202, data ingestion engine 210, data pre-processing engine 216, AI tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 210, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so an artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the AI engine subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 240. In still other cases, artificial intelligence engines that perform regression techniques may use live data 234 to predict or forecast continuous outcomes.

It will be understood that the embodiment of the AI engine subsystem 200 illustrated in FIG. 2 is exemplary and that other embodiments may vary. As another example, in some embodiments, the AI engine subsystem 200 may include more, fewer, or different components.

FIG. 3 illustrates an exemplary generative AI subsystem 300, in accordance with an embodiment of the invention. In some embodiments, the generative AI subsystem 300 may be included in a system (e.g., similar to the system 130 shown and described herein with respect to FIGS. 1A-1C). Additionally, or alternatively, the generative AI subsystem 300 may be a subsystem of another system (e.g., similar to the system 130 shown and described herein with respect to FIGS. 1A-1C) that is in communication with a system for heightened data security via AI-enhanced electronic message threat detection (e.g., via a network similar to the network 110 as shown and described herein with respect to FIGS. 1A-1C). Further, the generative AI subsystem 300 may be a subsystem of another system (e.g., similar to the system 130 shown and described herein with respect to FIGS. 1A-1C) that is in communication with (e.g., via a network similar to the network 110 as shown and described herein with respect to FIGS. 1A-1C) an AI engine subsystem (e.g., similar to the AI engine subsystem 200 as shown and described herein with respect to FIG. 2).

The generative AI subsystem 300 may include a data ingestion engine 302, a data pre-processing engine 304, a model training engine 306, and a loss function and optimization engine 308. It should be understood that the generative AI subsystem 300 is merely an example, and other embodiments may include more, fewer, or different components depending on the specific requirements and implementations of the system. For instance, additional engines for data validation, feature selection, or distributed computing may be integrated into the subsystem, or certain components described herein may be consolidated or omitted based on system performance objectives. Therefore, the generative AI subsystem 300 should not be considered limiting and may be adapted to various configurations within the scope of the invention.

The data ingestion engine 302 may identify various internal and/or external data sources to generate, test, and/or integrate new features for training the generative AI model. These internal and/or external data sources (e.g., text corpora, web-based text data, document repositories, or decentralized text storage system) may be initial locations where the data originates or where physical information is first digitized. In addition to conventional data sources, the data ingestion engine 302 may support decentralized storage systems, such as blockchain-based data sources, and privacy-preserving methods such as differential privacy. The data ingestion engine 302 may identify the location of the data and describe connection characteristics for access and retrieval of data. In some embodiments, data is transported from each data source using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like.

Depending on the nature of the data, the data ingestion engine 302 may move the data to a destination for storage or further analysis. Typically, the data may be in varying formats as they come from different sources, including RDBMS, other types of databases, S3 buckets, CSVs, and/or from streams. For a large language model ("LLM"), text data may originate from sources such as web scrapes, social media, large public text datasets, and/or the like. Since the data comes from different places, it needs to be cleansed and transformed so that it can be analyzed together with data from other sources. The data may be ingested in real-time, using stream processing, in batches using a batch data warehouse, or a combination of both. Stream processing may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse collects and transfers data in batches according to scheduled intervals, trigger events, and/or any other logical ordering.

In machine learning, the quality of data and the useful information that can be derived therefrom directly affects the ability of the machine learning model to learn. The data pre-processing engine 304 may implement advanced integration and processing steps needed to prepare the data for machine learning execution, including tokenization, text normalization, and removal of irrelevant elements like HTML tags in web-based data, especially for LLM training. This may include modules to perform any upfront, data transformation to consolidate the data into alternate forms by changing the value, structure, or format of the data using generalization, normalization, attribute selection, and aggregation, text-specific transformations such as stemming and lemmatization, data cleaning by filling missing values, smoothing the noisy data, resolving the inconsistency, and removing outliers, and/or any other encoding steps as needed. In some embodiments, the data pre-processing engine 304 may perform real-time pre-processing at the edge via edge computing devices, allowing for the transformation and reduction of data prior to transmission to centralized locations, thereby reducing latency and conserving network bandwidth.

In addition to improving the quality of the data, the data pre-processing engine 304 may transform categorical data into numerical formats that are suitable for machine learning algorithms. In this regard, the data pre-processing engine 304 may use techniques such as one-hot encoding or label encoding depending on the nature of the categorical variables and the intended use of the data.

In some embodiments, the data pre-processing engine 304 may also include dimensionality reduction techniques, where the number of input features is reduced while retaining the most relevant information. In this regard, the data pre-processing engine 304 may include methods such as Principal Component Analysis (PCA) or apply feature selection algorithms to remove redundant or irrelevant features, thereby reducing the computational complexity of the model training phase. Feature selection may be particularly beneficial in datasets with a high number of features, ensuring that the generative AI models do not overfit to noise or irrelevant details. The pre-processed data output from the data pre-processing engine 304 may then be fed into the model training engine 306.

The model training engine 306 may be responsible for training the generative AI models using the pre-processed data from the data pre-processing engine 304. The model training engine 306 may implement various machine learning algorithms, including but not limited to Generative Adversarial Networks (GANs), Variational Autoencoders (VAEs), transformers, diffusion models, or other specialized architectures depending on the specific requirements of the system. These models may be used in a broad range of applications, such as LLMs for text generation, image generation models, video synthesis models, audio generation models, and/or the like. The model training engine 306 may optimize these models by continuously adjusting their internal parameters based on the patterns and relationships identified within the data.

In some embodiments, the model training engine 306 may include a training data handler, which manages the partitioning of the pre-processed data into training, validation, and testing datasets. The training data is used to update the model's parameters, while the validation and testing datasets are reserved to evaluate the model's performance during and after training. The model training engine 306 may support various data-handling strategies, such as cross-validation or random shuffling, to ensure that the model generalizes well and is not overfitting to the training data.

In embodiments involving large language models, the model training engine 306 may utilize transformer-based architectures, such as the Transformer, BERT, GPT, or the like. Transformer models rely on mechanisms like self-attention to capture dependencies between words in a sequence, regardless of their distance from one another. The self-attention mechanism allows the model to weigh the importance of different words in a sentence and establish complex relationships important for understanding context. During training, the model may process vast amounts of text data and learn to predict the next word or token in a sequence based on the input context. This training process allows LLMs to generate coherent text, complete sentences, translate languages, or answer questions based on learned patterns from the data.

The transformer-based LLMs may be trained using autoregressive (e.g., GPT) or masked-language modeling techniques (e.g., BERT). In autoregressive models, the training process may include predicting the next word in a sequence by progressively revealing more context to the model. The model iteratively improves its predictions based on its performance during prior iterations. Masked-language modeling involves masking certain words in a sentence and training the model to correctly predict the masked words based on surrounding context. Both approaches enable LLMs to capture intricate patterns in human language, improving their ability to handle tasks such as summarization, translation, and text generation. Loss functions like cross-entropy loss may be used to optimize the model's performance by comparing predicted tokens with the actual tokens in the dataset to guide the model to minimize prediction errors during training.

In embodiments involving image generation models, the model training engine 306 may utilize transformer-based architectures, such as Vision Transformers (ViTs) or generative adversarial networks (GANs). Vision Transformers rely on self-attention mechanisms to process images as sequences of patches rather than whole images, allowing the model to capture spatial dependencies and patterns across the image. During training, the model may be exposed to large datasets containing diverse image types to learn features like textures, edges, and shapes. The model may then generate or reconstruct images by interpreting these patterns and applying learned spatial relationships. GAN-based models may also be used, where a generator network creates images, and a determinator network evaluates their realism, enabling the model to improve through adversarial training.

Image generation models may employ various training techniques, such as pixel-wise reconstruction or adversarial training, depending on the architecture. Pixel-wise reconstruction methods involve learning to reconstruct an image from its corrupted or downscaled version, optimizing the model to minimize the difference between the predicted and actual pixels (e.g., using mean squared error as the loss function). Adversarial training, often used with GANs, involves iteratively improving the generator network to produce images that are increasingly indistinguishable from real images, based on feedback from the determinator network. These approaches allow the model to capture complex visual features, enabling applications such as image synthesis, enhancement, and style transfer.

For video generation models, the model training engine 306 may employ transformer-based architectures like Video Transformers or GAN-based models specifically designed for handling temporal sequences. Video Transformers use self-attention mechanisms to model dependencies not only between pixels within a single frame but also across frames, allowing them to understand temporal relationships and motion patterns in videos. The model may be trained on large video datasets, enabling it to learn and reproduce dynamic changes and interactions between objects over time. GAN-based video models may incorporate spatiotemporal networks to evaluate the realism of generated video sequences, optimizing the model to produce continuous and coherent frames.

Video generation models may utilize spatial-temporal modeling techniques or adversarial training for generating realistic motion and video sequences. Spatial-temporal modeling involves learning the spatial features within each frame while simultaneously capturing the temporal dependencies between frames, optimizing the model's ability to predict future frames or complete missing sequences. Loss functions like mean squared error or perceptual loss may be applied to reduce discrepancies between predicted and actual frames. Adversarial training, on the other hand, may involve a generator creating video sequences and a determinator evaluating their realism, encouraging the generator to improve by minimizing the discrepancy identified by the determinator. These techniques may enable video generation models to create coherent and realistic sequences, useful in applications such as video synthesis and animation.

In audio generation models, the model training engine 306 may utilize architectures such as Audio Transformers or recurrent neural networks (RNNs) like WaveNet, designed to handle sequential and waveform data. Audio Transformers leverage attention mechanisms to capture relationships between segments of audio, allowing them to model temporal dependencies and predict the next audio sample based on previous context. During training, the model may process large audio datasets containing diverse sound patterns to learn representations of different audio features, such as frequency, amplitude, and harmonics. This training enables the model to generate coherent audio sequences, including speech, music, or ambient sounds, by synthesizing these learned patterns.

Audio generation models may be trained using sequence modeling techniques or autoregressive methods, depending on the architecture. Sequence modeling techniques involve processing and predicting sequences of audio samples, optimizing the model to capture and reproduce temporal dependencies in sound. Autoregressive methods, such as those employed in WaveNet, focus on predicting each audio sample based on prior samples, progressively refining the generated audio sequence over multiple iterations. Loss functions like mean absolute error or cross-entropy loss may be used to minimize the error between predicted and actual audio samples, guiding the model to improve its accuracy. These approaches allow audio generation models to create continuous and realistic audio outputs, applicable in areas such as speech synthesis, music generation, and sound effect creation.

The reconstruction loss ensures that the difference between the original input and the reconstructed output is minimized, guiding the decoder to generate outputs that closely resemble the input data. The second component, KL divergence loss, regularizes the latent space by ensuring that the distribution of latent variables conforms to a predefined probabilistic distribution, often a Gaussian distribution. This constraint encourages the model to learn a well-organized and smooth latent space, allowing for meaningful sampling from this space during inference. By combining these loss functions, the VAE can learn a latent space that not only captures the underlying patterns in the data but also allows for the generation of novel outputs by sampling new points from this space. During the inference phase, the trained model can sample random points from the latent space to generate new, previously unseen data instances.

In training generative AI models, the model training engine 306 may implement optimization techniques such as gradient clipping, learning rate scheduling, and mixed-precision training. Gradient clipping may be used to stabilize the training process, especially in transformer-based models, by capping the magnitude of gradients to prevent them from becoming excessively large. Learning rate scheduling may involve gradually increasing the learning rate during initial training phases (warm-up) and then decaying it as training progresses to fine-tune the model's parameters more effectively. Mixed-precision training, which leverages lower-precision (e.g., float16) arithmetic while retaining higher precision (e.g., float33) for specific calculations, may be used to accelerate training and reduce memory consumption, enabling the model to scale efficiently even when trained on large datasets.

In some embodiments, the model training engine 306 may implement early stopping mechanisms to prevent overfitting. Early stopping monitors the generative AI model's performance on the validation dataset, halting the training process if the performance does not improve after a specified number of iterations. This ensures that the generative AI model does not continue training on noise or irrelevant patterns, which could degrade its performance on unseen data. The model training engine 306 may also support distributed training across multiple computing nodes, allowing the system to scale its computational resources as needed. Distributed training may involve splitting the generative AI model and data across multiple machines or GPUs, where each node processes a portion of the data and updates the model in parallel. This is particularly useful for large datasets or models that require significant computational power, such as deep generative models. The model training engine 306 may synchronize the updates across the nodes using techniques like synchronous or asynchronous gradient descent.

Once the generative AI model is trained, the model training engine 306 may save the final trained generative AI model in a persistent storage location for future use. In specific embodiments, metadata such as the number of epochs, the final loss values, and values of learned parameters may be logged for model versioning and/or retraining at a later stage. In some embodiments, the model training engine 306 may also implement transfer learning, where a pre-trained model is fine-tuned on a smaller, domain-specific dataset. This may reduce the amount of time and data required to train a new model, especially in cases where the available data is limited or highly specialized. The model training engine 306 may adjust the parameters of the pre-trained model to better align with the new dataset, while preserving the learned features from the original training.

In embodiments involving LLMs, new output is generated by sampling from the model's probability distribution of tokens, conditioned on the context provided as input. Transformer-based architectures, such as GPT, use an auto-regressive approach where the model predicts the next token in a sequence one step at a time, using previously generated tokens as input for subsequent predictions. The process starts with a prompt or an initial sequence of words, and the model iteratively generates new tokens, forming coherent sentences or paragraphs based on the learned context and language patterns. For masked-language modeling (e.g., BERT), new output may be generated by filling in masked parts of the input sequence, allowing the model to complete sentences or generate variations of the provided text. The generated output can be controlled by adjusting parameters such as heat, which influences the randomness of the token sampling, enabling the generation of diverse or deterministic responses.

In image generation models, such as those using ViTs or GANs, new output is generated by sampling from the learned distribution in the model's latent space. For GANs, the generator network creates an image by transforming random noise vectors into structured image outputs through a series of layers that learn visual features like shapes, textures, and colors. The generated image is then refined through adversarial feedback from the determinator network, which assesses the realism of the generated output. For transformer-based image models, the process may involve reconstructing images by assembling patches based on the learned dependencies between them. Input conditions, such as prompts describing desired features or specific noise vectors, guide the generation process, allowing for the creation of customized images or variations of existing visual styles. These models may also generate images based on style transfer techniques or predefined templates, synthesizing images that align with the characteristics present in the training data.

Video generation models utilize spatiotemporal dependencies to synthesize new video sequences based on the patterns learned during training. In transformer-based architectures, the model may generate video frames sequentially, predicting the next frame based on the input frames and the temporal context established by prior frames. GAN-based models, specifically designed for video synthesis, may sample noise vectors, or use a sequence of frames as input, transforming these into continuous and temporally coherent video outputs through the generator network. The determinator evaluates the temporal consistency and realism of the output, ensuring the generated video mimics the motion dynamics and object interactions present in real-world video data. Such models may also use attention mechanisms to focus on critical elements within each frame and their evolution across time, facilitating realistic scene transitions and motion patterns. The generation process may include user-defined input such as initial frames, motion descriptions, or specific video attributes, providing control over the output.

Audio generation models, including Audio Transformers or autoregressive architectures like WaveNet, generate new audio sequences by predicting audio samples based on learned dependencies in sequential sound data. For autoregressive models, the generation process involves producing each audio sample one at a time, conditioned on previously generated samples, allowing the model to build complex audio patterns such as speech, music, or ambient sounds. The model starts with an initial segment or a random seed and uses its learned parameters to predict and synthesize subsequent samples, constructing a continuous audio waveform. Audio Transformers, on the other hand, may use attention mechanisms to identify important temporal segments within the input audio and synthesize new output based on these learned patterns. The user can control the type of audio generated by providing parameters such as pitch, tempo, or initial sound clips, enabling the model to generate outputs tailored to specific use cases like speech synthesis, music composition, or environmental sound generation.

In some embodiments, generative AI models may also integrate multiple modalities, enabling cross-modal generation where output in one modality influences or conditions the generation in another. For example, a video generation model may use text descriptions as input, synthesizing video content that aligns with the specified narrative or visual scene described. Similarly, image generation models may generate visual representations based on audio inputs, such as generating animations synchronized to musical rhythms or speech patterns. These cross-modal systems typically involve conditional GANs or multi-modal transformers, where the model processes input from one domain (e.g., text or audio) and learns to generate output in another domain (e.g., video or image) by aligning the patterns and dependencies between the different modalities. These models may allow users to generate complex, multimodal content based on combinations of inputs, such as using textual prompts to control the visual and auditory elements of a video.

It will be understood that the embodiment of the generative AI subsystem 300 illustrated in FIG. 3 is exemplary and that other embodiments may vary. The generative AI subsystem 300, as well as its constituent elements, may vary, and modifications or alternative configurations may be implemented without departing from the broader scope of the invention. For instance, different machine learning algorithms, data sources, optimization techniques, or training methodologies may be employed depending on system requirements, application domain, and available computational resources. Furthermore, features and functionalities described in one embodiment may be combined with those of another embodiment as needed, and vice versa.

FIG. 4 illustrates a flowchart 400 for heightened data security via AI-enhanced electronic message threat detection, in accordance with an embodiment of the disclosure. In some embodiments, a system (e.g., similar to one or more of the systems shown and described herein with respect to FIGS. 1A-1C) may perform one or more of the steps of flowchart 400. For example, a heightened data security via AI-enhanced electronic message threat detection system (e.g., similar to the system 130 shown and described herein with respect to FIG. 1A-1C) may perform one or more of the steps of flowchart 400. In some embodiments, an artificial intelligence engine (e.g., similar to the AI engine subsystem 200 as shown and described herein with respect to FIG. 2) may perform one or more of the steps of flowchart 400. Additionally, or alternatively, a generative artificial intelligence engine (e.g., similar to the generative AI subsystem 300 as shown and described herein with respect to FIG. 3) may perform one or more of the steps of flowchart 400.

As will be understood by one of ordinary skill in the art in view of the present disclosure, the internet 404 may be considered a global network connecting devices enabling data exchange. Generic URL web servers 402 may be considered a type of server on this network that may host and serve web content (e.g., text and images) in response to requests from clients (e.g., web browsers) that may be identified via URLs (e.g., web addresses that specify a location of a resource on the internet 404, pointing to a particular web server). In some embodiments, the internet 404 may include a plurality of users where a subset of the plurality of users may include deceptive attackers 406 (e.g., users with malicious intent). Further, the deceptive attackers 406 may each be associated with one or more deceptive websites 408 (e.g., websites generated for malicious purposes) connected to the internet 404. In some embodiments, exchange mail service servers 412 may be connected to the internet 404 and may serve as infrastructure to host an electronic message platform 416 that may be used by a subset of the plurality of users.

In some embodiments, user devices associated with the plurality of users connected to the internet 404 may include firewalls 410 configured as a security system that may monitor and control incoming network traffic on a user device. In such embodiments, the firewalls 410 may not be an adequate safeguard to prevent users from accessing malicious content, such as the deceptive websites 408, when interacting with an electronic message sent by the deceptive attackers 406 to a user on the electronic message platform 416. As such, an anti-deceptive AI engine 418 may be employed to prevent users from interacting with any electronic messages with a high threat level.

In some embodiments, the anti-deceptive AI engine 418 may include an AI model 420 (e.g., a NLP model) that may generate AI data (e.g., a set of contextual data of an electronic message) as it operates, a URL validation sandbox 422 (e.g., an isolated environment) that may generate URL data (e.g., a set of contextual data of a URL), and/or a data retention repository 424 that may store activity data (e.g., user interactions with an electronic message and/or AI module interactions with an electronic message). In such embodiments, the anti-deceptive AI engine 418 may be configured to ingest an electronic message prior to transmission to an intended user and to analyze, via the AI model 420, the body of electronic message to determine an intent of the electronic message. Additionally, or alternatively, the AI model 420 may identify an embedded link (e.g., a URL) in the electronic message. Further, the embedded link may be analyzed in the URL validation sandbox 422 to safely determine the destination of the embedded link, any threats associated with the embedded link, and/or generate a set of contextual data associated with the embedded link. In some embodiments, the AI model 420 may ingest the set of contextual data from the URL validation sandbox 422 and compare it against the analysis of the body of the electronic message to evaluate if the contextual conditions of both match. Additionally, or alternatively, data related to the interactions of the AI model 420 and/or the URL validation sandbox 422 may be recorded in the data retention repository 424.

In some embodiments, the anti-deceptive AI engine 418 may be configured as an anti-deceptive AI module 419 where the anti-deceptive AI module 419 may serve as a local plugin for the electronic message platform 416 on a user device of a user. Additionally, or alternatively, the anti-deceptive AI module 419 may include one or more operational modes (e.g., fully autonomous mode, semi-autonomous mode, and/or disabled mode) that may be set by a user. In such embodiments, a user may have, depending on the operational mode, access to electronic messages that may have malicious content. Further, the user may interact with the electronic messages and the user interactions may be stored in the data retention repository 424.

In some embodiments, the anti-deceptive AI module 419 may be operably coupled, via an API, to a SIEM (Security Information and Event Management) platform 426 configured to collect and/or analyze data directed to electronic message threat concerns from various sources to detect, monitor, and/or respond to potential threats in real-time.

The flowchart 400 may include additional embodiments, such as any single embodiment or any combination of embodiments described herein. Although FIG. 4 shows example blocks of the flowchart 400, in some embodiments, the flowchart 400 may include additional blocks, fewer blocks, different blocks, or differently arranged blocks than those depicted in FIG. 4. Additionally, or alternatively, two or more of the blocks of the flowchart 400 may be performed in parallel. In some embodiments, the steps of flowchart 400 may be performed for a plurality of users simultaneously and/or at different times.

FIG. 5 illustrates a process flow 500 for heightened data security via AI-enhanced electronic message threat detection, in accordance with an embodiment of the invention. In some embodiments, a system (e.g., similar to one or more of the systems shown and described herein with respect to FIGS. 1A-1C) may perform one or more of the steps of process flow 500. For example, a heightened data security via AI-enhanced electronic message threat detection system (e.g., similar to the system 130 shown and described herein with respect to FIG. 1A-1C) may perform one or more of the steps of process flow 500. In some embodiments, an artificial intelligence engine (e.g., similar to the AI engine subsystem 200 as shown and described herein with respect to FIG. 2) may perform one or more of the steps of process flow 500. Additionally, or alternatively, a generative artificial intelligence engine (e.g., similar to the generative AI subsystem 300 as shown and described herein with respect to FIG. 3) may perform one or more of the steps of process flow 500.

In some embodiments, and as shown in block 502, the process flow 500 may include the step of receiving, via a network interface, an electronic message including a plurality of data elements. In such embodiments, the electronic message may have been transmitted from a known or unknown source to a user account of a user on an electronic message platform (e.g., similar to one or more steps of the flowchart 400 as shown and described herein with respect to FIG. 4). Further, the electronic message platform may be networked, be operably coupled, and/or have integrated (e.g., as a plugin) an AI engine (e.g., similar to the anti-deceptive AI engine 418 as shown and described herein with respect to FIG. 4) including an AI model configured to analyze the electronic message prior to a user having access to the electronic message.

In some embodiments, and as shown in block 504, the process flow 500 may include the step of analyzing, via an AI model, the plurality of data elements to generate a first set of contextual data. In such embodiments, the AI model may be configured as an NLP model and/or any other model types using any combination of AI model steps and/or methods as described herein to determine context and/or intent of the electronic message. For example, to analyze the plurality of data elements to generate the first set of contextual data, the AI model may first preprocess the plurality of data elements (e.g., by tokenizing, removing stop words, and/or performing lemmatization or stemming). The AI model may then segment the plurality of data elements and may use one or more techniques to identify important data elements of the plurality of data elements and understand relationships between data elements of the plurality of data elements (e.g., Named Entity Recognition, dependency parsing, and/or the like). The AI model may further apply additional techniques to capture themes of the plurality of data elements and/or resolve coreferences to track the important data elements throughout the body of the electronic message (e.g., topic modeling, sentence embeddings, and/or the like). For generating the first set of contextual data, the AI model may extract key data elements (e.g., extractive summarization) and/or generate new data elements (e.g., abstractive summarization) while maintaining the meaning of the electronic message. Additionally, or alternatively, during the analysis of the plurality of data elements, the AI model may flag any of the data elements of the plurality of data elements associated with an embedded link (e.g., a URL).

In some embodiments, and as shown in block 506, the process flow 500 may include the step of generating, via the first set of contextual data, a threat level of the electronic message. In such embodiments, the electronic message may be directed to a malicious intent (e.g., gaining access to sensitive data). Further, the threat level may be used to determine a probability an electronic message is directed towards a malicious purpose (e.g., if a model determines a high threat level of a first set of contextual data of an electronic message, the electronic message has a high probability of having a malicious purpose). As such, the AI model and/or another model may be configured to ingest the first set of contextual data and generate a threat level for the associated electronic message.

For example, to generate a threat level for an electronic message, the model may analyze a first set of contextual data and/or a plurality of data elements associated with the electronic message for indicators of malicious content by starting with preprocessing and/or keyword detection. Further, the model may identify suspicious phrases or terms commonly associated with deceptive, malware, and/or hacking. The model may also use Named Entity Recognition to spot important data elements (e.g., URLs, email addresses, or organizations that may be linked to known malicious sources). Additionally, or alternatively, sentiment and intent analysis may help the model detect manipulative language, while link and/or attachment analysis assesses if the electronic message includes embedded links directing a user to harmful websites and/or includes malicious attachments.

Additionally, the model may apply machine learning classifiers trained on labeled datasets to categorize the first set of contextual data as benign or malicious, assigning a threat level based on the presence of threatening keywords, sentiment, and/or known malicious entities. Further, behavioral analysis may check for embedded links, scripts, and/or instructions to perform harmful actions, and contextual factors such as source verification and historical patterns may be considered. Combining the aforementioned model methods, the model may calculate a threat level (e.g., low, medium, or high, a probability, a percentage, and/or the like) to determine a probability that the electronic message is malicious.

In some embodiments, and as shown in block 508, the process flow 500 may include the step of identifying, if the threat level is below a threshold, one or more data elements of the plurality of data elements associated with a uniform resource locator (URL). In such embodiments, the threshold may be set by a user, an entity, an administrator, and/or the like such that an electronic message with a threat level above the threshold may be considered malicious and an electronic message with a threat level below the threshold may be initially considered unlikely to be malicious. As such, electronic messages may initially have their bodies of text analyzed by the AI model to determine a threat level of the text content of the electronic message. In this way, electronic messages that are obviously directed to malicious purposes may be blocked from transmission to a user without using further consuming computing resources to analyze other elements of the electronic messages (e.g., without analyzing embedded links in an isolated environment).

In some embodiments, analyzing the plurality of data elements of the electronic message and the first set of contextual data generated from the plurality of data elements may yield a threat level below the threshold; however, one or more of data elements of the plurality of data elements may be associated with a URL. In such embodiments, the AI model may identify (e.g., via any of the model methods as described herein) the one or more data elements associated with the URL to be simulated to further analyze the intent of the electronic message. Additionally, or alternatively, if the threat level is above the threshold, the electronic message may be block from transmission to the user.

In some embodiments, and as shown in block 510, the process flow 500 may include the step of simulating the URL in an isolated environment to obtain a URL simulation. In such embodiments, the AI engine may include the isolated environment (e.g., similar to the URL validation sandbox 422 of the anti-deceptive AI engine 418 as shown and described herein with respect to FIG. 4) configured to simulate the URL such that the AI model may be operably coupled to the isolated environment. Additionally, or alternatively, the AI model may transmit the identified one or more data elements associated with the URL to the isolated environment such that the nature of the content of the URL may be analyzed and data associated with the URL context may be generated. In some embodiments, the step of block 510 of the process flow 500 may be performed by one or more steps of the process flow 700 as shown and described herein with respect to FIG. 7.

In some embodiments, and as shown in block 512, the process flow 500 may include the step of comparing the URL simulation to the first set of contextual data to determine if the URL simulation matches the first set of contextual data. In such embodiments, the URL simulation may result in a second set of contextual data associated with content (e.g., a webpage) associated with the URL. Further, the second set of contextual data may be compared against the first set of contextual data to determine if the content of the text body of the electronic message matches the content associated with the URL (e.g., the text body of the electronic messages may claim to be associated with an entity, but the URL directs to a webpage not associated with the entity). In some embodiments, the step of block 512 of the process flow 500 may be performed by one or more steps of the process flow 800 as shown and described herein with respect to FIG. 8.

In some embodiments, and as shown in block 514, the process flow 500 may include the step of blocking, if the URL simulation does not match the first set of contextual data, transmission of the electronic message to a user. In such embodiments, the AI model may determine that the content of the URL simulation does not match the first set of contextual data, and, as such, the threat level of the electronic message has increased to a point above the threshold. Further, given the threat level is above the threshold, the AI model may be configured to block transmission of the electronic message to the user to prevent any user interactions with malicious content. In some embodiments, the step of block 514 of the process flow 500 may be performed after one or more steps of the process flow 600 as shown and described herein with respect to FIG. 6.

The process flow 500 may include additional embodiments, such as any single embodiment or any combination of embodiments described herein. Although FIG. 5 shows example blocks of the process flow 500, in some embodiments, the process flow 500 may include additional blocks, fewer blocks, different blocks, or differently arranged blocks than those depicted in FIG. 5.

FIG. 6 illustrates another process flow 600 for heightened data security via AI-enhanced electronic message threat detection, in accordance with an embodiment of the invention. In some embodiments, a system (e.g., similar to one or more of the systems shown and described herein with respect to FIGS. 1A-1C) may perform one or more of the steps of process flow 600. For example, a heightened data security via AI-enhanced electronic message threat detection system (e.g., similar to the system 130 shown and described herein with respect to FIG. 1A-1C) may perform one or more of the steps of process flow 600. In some embodiments, an artificial intelligence engine (e.g., similar to the AI engine subsystem 200 as shown and described herein with respect to FIG. 2) may perform one or more of the steps of process flow 600. Additionally, or alternatively, a generative artificial intelligence engine (e.g., similar to the generative AI subsystem 300 as shown and described herein with respect to FIG. 3) may perform one or more of the steps of process flow 600.

In some embodiments, and as shown in block 602, the process flow 600 may include the step of transmitting, via a network interface, a notification including a summary of a first set of contextual data and a URL to a user. In some embodiments, an AI engine (e.g., similar to the anti-deceptive AI engine 418 as shown and described herein with respect to FIG. 4) may be configured to have one or more operating modes. In such embodiments, the AI engine may be configured to initially operate in a fully autonomous mode (e.g., similar to the steps of the process flow 500 as shown and described herein), where user interactions with identified electronic messages with a high threat level are fully eliminated, but may include functionalities that allow users to select an alternate operating mode. For example, a user may be able to interact with a GUI associated with the AI engine to select an alternate operating mode such as a semi-autonomous operating mode. In such embodiments, instead of automatically blocking transmission of an electronic message to a user, the AI engine may be configured to generate a summary including the first set of contextual data, contextual data of the URL, and/or a threat level of the electronic message. The summary may be included in a notification generated by the AI engine that is then sent to the user and/or users the electronic message was intended for. Additionally, or alternatively, in this mode, the AI engine may not transmit the notification to the user and/or users if the threat level is below a threshold by a set amount (e.g., a threshold, in terms of probability, may be set at 75% and, if a threat level of an electronic message is 60% below the threshold, the notification may not be sent).

In some embodiments, and as shown in block 604, the process flow 600 may include the step of allowing a transmission of an electronic message to the user. In such embodiments, the user may review the summary included in the notification and indicate (e.g., by interacting with an interactable environment included in the notification) a desire to interact with the electronic message. As such, the AI engine may then allow the electronic message to be transmitted to the user, so that the user may interact with the electronic message. In such embodiments, a database may be configured to store data associated with the analysis performed by the AI engine and data associated with user interactions with the electronic message.

The process flow 600 may include additional embodiments, such as any single embodiment or any combination of embodiments described herein. Although FIG. 6 shows example blocks of the process flow 600, in some embodiments, the process flow 600 may include additional blocks, fewer blocks, different blocks, or differently arranged blocks than those depicted in FIG. 6.

FIG. 7 illustrates another process flow 700 for heightened data security via AI-enhanced electronic message threat detection, in accordance with an embodiment of the invention. In some embodiments, a system (e.g., similar to one or more of the systems shown and described herein with respect to FIGS. 1A-1C) may perform one or more of the steps of process flow 700. For example, a heightened data security via AI-enhanced electronic message threat detection system (e.g., similar to the system 130 shown and described herein with respect to FIG. 1A-1C) may perform one or more of the steps of process flow 700. In some embodiments, an artificial intelligence engine (e.g., similar to the AI engine subsystem 200 as shown and described herein with respect to FIG. 2) may perform one or more of the steps of process flow 700. Additionally, or alternatively, a generative artificial intelligence engine (e.g., similar to the generative AI subsystem 300 as shown and described herein with respect to FIG. 3) may perform one or more of the steps of process flow 700.

In some embodiments, and as shown in block 702, the process flow 700 may include the step of executing a URL in an isolated environment to simulate the URL. In such embodiments, an electronic message may have been received by an AI engine (e.g., similar to the anti-deceptive AI engine 418 as shown and described herein with respect to FIG. 4) that may include an isolated environment (e.g., similar to the URL validation sandbox 422 as shown and described herein with respect to FIG. 4) configured to simulate embedded links (e.g., URLs) included in electronic messages and an AI model may have identified data elements in the electronic message directed to the URL. The isolated environment may then execute the URL to determine data and/or context associated with the URL.

By way of example, to execute and generate an analysis of the URL in the isolated environment, the isolated environment may have a local DNS setup that ensures any domain included in the URL is resolved internally in order to prevent unintended access to real external websites. Once the URL has been identified, the URL may be tested by simulating a request (e.g., an HTTP request) within the isolated environment using a mock server or tool (e.g., cURL, wget, Selenium, and/or the like). In such embodiments, if the URL leads to a webpage, the isolated environment may mimic a browsing session where it may analyze the content (e.g., HTML, JavaScript, and/or the like) without connecting to the internet. As the URL is being simulated, the isolated environment may log interactions with the URL (e.g., redirects, HTTP status codes, payloads delivered, and/or the like). Further, the isolated environment may simulate the full behavior of the URL (e.g., by following an HTTP response chain while remaining isolated from the internet). Additionally, or alternatively, if the URL redirects to another location, each step may be monitored, and the final destination may be recorded. In such embodiments, the content of the final destination may be analyzed to determine the context surrounding it and/or a threat level. Additionally, or alternatively, all network traffic may be monitored and/or logged (e.g., including outbound communications, to detect suspicious behavior like connecting to known malicious IP addresses).

In some embodiments, and as shown in block 704, the process flow 700 may include the step of generating a second set of contextual data associated with the URL. In such embodiments, following the execution of the URL simulation, the isolated environment may generate a detailed log of the URL's actions. Further, the detailed log may be used to generate the second set of contextual data detailing information surrounding the content and/or behavior of the URL.

In some embodiments, and as shown in block 706, the process flow 700 may include the step of transmitting the second set of contextual data to an AI model. In such embodiments, the second set of contextual data may be needed by the AI model for analysis in combination with a first set of contextual data (e.g., data associated with the text of the electronic message) to determine if the content of the URL matches and/or makes sense in view of the information included within the electronic message. In this way, the AI engine offers an additional means of verifying the intent behind an electronic message being sent to one or more users.

The process flow 700 may include additional embodiments, such as any single embodiment or any combination of embodiments described herein. Although FIG. 7 shows example blocks of the process flow 700, in some embodiments, the process flow 700 may include additional blocks, fewer blocks, different blocks, or differently arranged blocks than those depicted in FIG. 7. Additionally, or alternatively, two or more of the blocks of the process flow 700 may be performed in parallel.

FIG. 8 illustrates another process flow 800 for heightened data security via AI-enhanced electronic message threat detection, in accordance with an embodiment of the invention. In some embodiments, a system (e.g., similar to one or more of the systems shown and described herein with respect to FIGS. 1A-1C) may perform one or more of the steps of process flow 800. For example, a heightened data security via AI-enhanced electronic message threat detection system (e.g., similar to the system 130 shown and described herein with respect to FIG. 1A-1C) may perform one or more of the steps of process flow 800. In some embodiments, an artificial intelligence engine (e.g., similar to the AI engine subsystem 200 as shown and described herein with respect to FIG. 2) may perform one or more of the steps of process flow 800. Additionally, or alternatively, a generative artificial intelligence engine (e.g., similar to the generative AI subsystem 300 as shown and described herein with respect to FIG. 3) may perform one or more of the steps of process flow 800.

In some embodiments, and as shown in block 802, the process flow 800 may include the step of comparing, via an AI model, a first set of contextual data with a second set of contextual data to generate a match measurement. In such embodiments, the first set of contextual data may be associated with analysis performed by the AI model of an AI engine (e.g., similar to the anti-deceptive AI engine 418 as shown and described herein with respect to FIG. 4) on text of an electronic message. Additionally, or alternatively, the second set of contextual data may be associated with a simulation performed in an isolated environment of the AI engine on a URL included in the electronic message. In some embodiments, the first set of contextual data is compared to the second set of contextual data by the AI model to determine if the text body of the electronic message matches a destination of the URL (e.g., the electronic message claims to be associated with an entity, but the destination of the URL is not associated with the entity, the text body claims to be for a certain purpose, but the destination of the URL is not directed to that purpose, and/or the like). During the comparison of the first set and second set, the AI model may, in some embodiments, compare each data element of the first set to each data element of the second set to generate the match measurement between the sets.

In some embodiments, the step of the block 802 of the process flow 800 may be performed in conjunction with, following, and/or prior to the step of the block 512 of the process flow 500 as shown and described herein with respect to FIG. 5. Additionally, or alternatively, the step of the block 802 of the process flow 800 may be performed following the step of the block 704 of the process flow 700 as shown and describe herein with respect to FIG. 7.

In some embodiments, and as shown in block 804, the process flow 800 may include the step of determining to block an electronic message if the match measurement is below a threshold. In such embodiments, the AI model may include the threshold directed to a set value where the first set of contextual data and the second set of contextual data may be considered to be directed to the same context. Additionally, or alternatively, the AI model may be configured to adjust the threshold as it operates and/or based on received feedback. In some embodiments, if the match measurement is above the threshold, the AI model may determine that the electronic message associated with the first set of contextual data and the second set of contextual data has a threat level below a threat level threshold and is safe for transmission to an intended user. Additionally, or alternatively, if the match measurement is below the threshold, the AI model may determine that the electronic message has a threat level above a threat level threshold and must be blocked from transmission from the intended user.

The process flow 800 may include additional embodiments, such as any single embodiment or any combination of embodiments described herein. Although FIG. 8 shows example blocks of the process flow 800, in some embodiments, the process flow 800 may include additional blocks, fewer blocks, different blocks, or differently arranged blocks than those depicted in FIG. 8.

FIG. 9 illustrates another process flow 900 for heightened data security via AI-enhanced electronic message threat detection, in accordance with an embodiment of the invention. In some embodiments, a system (e.g., similar to one or more of the systems shown and described herein with respect to FIGS. 1A-1C) may perform one or more of the steps of process flow 900. For example, a heightened data security via AI-enhanced electronic message threat detection system (e.g., similar to the system 130 shown and described herein with respect to FIG. 1A-1C) may perform one or more of the steps of process flow 900. In some embodiments, an artificial intelligence engine (e.g., similar to the AI engine subsystem 200 as shown and described herein with respect to FIG. 2) may perform one or more of the steps of process flow 900. Additionally, or alternatively, a generative artificial intelligence engine (e.g., similar to the generative AI subsystem 300 as shown and described herein with respect to FIG. 3) may perform one or more of the steps of process flow 900.

In some embodiments, and as shown in block 902, the process flow 900 may include the step of causing a user device to display an interactable environment. In such embodiments, the user device may be displaying an electronic message platform with an integrated AI engine (e.g., similar to the anti-deceptive AI module 419 as shown and described herein with respect to FIG. 4). Further, a user of the user device may interact with an environment of the electronic message platform to cause the user device to display the interactable environment.

In some embodiments, and as shown in block 904, the process flow 900 may include the step of receiving a user interaction with the interactable environment to opt out of electronic message blocking. In such embodiments, the interactable environment may display one or more options for one or more operating modes of the AI engine (e.g., fully autonomous mode, semi-autonomous mode, and/or disabled mode). Further, the user may choose to interact with one of the one or more options to set and/or change the operating mode of the AI engine. Additionally, or alternatively, an entity associated with the user may choose to disable selection of one or more options of the one or more options. In some embodiments, the user may decide to disable the AI engine from analyzing incoming electronic messages and, as such, interact with an option of the one or more options associated with a disabled mode for the AI engine.

In some embodiments, and as shown in block 906, the process flow 900 may include the step of, after receiving the user interaction, receiving, via a network interface, another electronic message. In such embodiments, reception of the user interaction may cause the AI engine to enter the disabled mode, where the AI engine does not review incoming electronic messages for the user. Further, the electronic message platform displayed on the user device may receive the other electronic message intended for the user.

In some embodiments, and as shown in block 908, the process flow 900 may include the step of allowing, based on the user interaction, transmission of the other electronic message. In such embodiments, upon reception of the other electronic message in the electronic message platform, the AI engine, due to the user interaction, may allow the transmission of the other electronic message without reviewing any of the data elements included in the other electronic message.

The process flow 900 may include additional embodiments, such as any single embodiment or any combination of embodiments described herein. Although FIG. 9 shows example blocks of the process flow 900, in some embodiments, the process flow 900 may include additional blocks, fewer blocks, different blocks, or differently arranged blocks than those depicted in FIG. 9.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the “C” programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in party to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for heightened data security via artificial intelligence-enhanced electronic message threat detection, the system comprising:

a network interface configured to communicate via a communication network;

at least one non-transitory storage device comprising computer program code stored thereon; and at least one processing device operably coupled to the network interface and the at least one non-transitory storage device, wherein the computer program code comprises computer instructions configured to cause the processing device to:

receive, via the network interface, an electronic message comprising a plurality of data elements;

analyze, via an artificial intelligence (AI) model, the plurality of data elements to generate a first set of contextual data;

generate, via the first set of contextual data, a threat level of the electronic message;

identify, if the threat level is below a threshold, one or more data elements of the plurality of data elements associated with a uniform resource locator (URL);

simulate the URL in an isolated environment to obtain a URL simulation;

compare the URL simulation to the first set of contextual data to determine if the URL simulation matches the first set of contextual data; and block, if the URL simulation does not match the first set of contextual data, transmission of the electronic message to a user.

2. The system of claim 1, wherein the at least one non-transitory storage device comprises computer-executable program code that, when executed by the at least one processing device, causes the at least one processing device to, prior to blocking the transmission of the electronic message:

transmit, via the network interface, a notification comprising a summary of the first set of contextual data and the URL to the user; and allow the transmission of the electronic message to the user.

3. The system of claim 2, wherein a database is configured to store data associated with the analysis of the AI model and data associated with user interactions with the electronic message.

4. The system of claim 1, wherein the AI model and the isolated environment are stored locally and integrated in one or more electronic message platforms.

5. The system of claim 1, wherein the at least one non-transitory storage device comprises computer-executable program code that, when executed by the at least one processing device, causes the at least one processing device to, when simulating the URL;

execute the URL in the isolated environment to simulate the URL;

generate a second set of contextual data associated with the URL; and transmit the second set of contextual data to the AI model.

6. The system of claim 5, wherein the at least one non-transitory storage device comprises computer-executable program code that, when executed by the at least one processing device, causes the at least one processing device to, when comparing the URL simulation to the first set of contextual data:

compare, via the AI model, the first set of contextual data with the second set of contextual data to generate a match measurement; and determine to block the electronic message if the match measurement is below a threshold.

7. The system of claim 1, wherein the at least one non-transitory storage device comprises computer-executable program code that, when executed by the at least one processing device, causes the at least one processing device to:

cause a user device to display an interactable environment;

receive a user interaction with the interactable environment to opt out of electronic message blocking;

after receiving the user interaction, receive, via the network interface, another electronic message; and allow, based on the user interaction, transmission of the other electronic message.

8. A computer program product for heightened data security via artificial intelligence-enhanced electronic message threat detection, the computer program product comprising a non-transitory computer-readable medium comprising code causing an apparatus to:

receive, via a network interface, an electronic message comprising a plurality of data elements;

analyze, via an artificial intelligence (AI) model, the plurality of data elements to generate a first set of contextual data;

generate, via the first set of contextual data, a threat level of the electronic message;

identify, if the threat level is below a threshold, one or more data elements of the plurality of data elements associated with a uniform resource locator (URL);

simulate the URL in an isolated environment to obtain a URL simulation;

compare the URL simulation to the first set of contextual data to determine if the URL simulation matches the first set of contextual data; and block, if the URL simulation does not match the first set of contextual data, transmission of the electronic message to a user.

9. The computer program product of claim 8, wherein the non-transitory computer-readable medium comprises code causing an apparatus to, prior to blocking the transmission of the electronic message:

transmit, via the network interface, a notification comprising a summary of the first set of contextual data and the URL to the user; and allow the transmission of the electronic message to the user.

10. The computer program product of claim 9, wherein a database is configured to store data associated with the analysis of the AI model and data associated with user interactions with the electronic message.

11. The computer program product of claim 8, wherein the AI model and the isolated environment are stored locally and integrated in one or more electronic message platforms.

12. The computer program product of claim 8, wherein the non-transitory computer-readable medium comprises code causing an apparatus to, when simulating the URL;

execute the URL in the isolated environment to simulate the URL;

generate a second set of contextual data associated with the URL; and transmit the second set of contextual data to the AI model.

13. The computer program product of claim 12, wherein the non-transitory computer-readable medium comprises code causing an apparatus to, when comparing the URL simulation to the first set of contextual data:

compare, via the AI model, the first set of contextual data with the second set of contextual data to generate a match measurement; and determine to block the electronic message if the match measurement is below a threshold.

14. The computer program product of claim 8, wherein the non-transitory computer-readable medium comprises code causing an apparatus to:

cause a user device to display an interactable environment;

receive a user interaction with the interactable environment to opt out of electronic message blocking;

after receiving the user interaction, receive, via the network interface, another electronic message; and allow, based on the user interaction, transmission of the other electronic message.

15. A computer-implemented method for heightened data security via artificial intelligence-enhanced electronic message threat detection, the method comprising:

receiving, via a network interface, an electronic message comprising a plurality of data elements;

analyzing, via an artificial intelligence (AI) model, the plurality of data elements to generate a first set of contextual data;

generating, via the first set of contextual data, a threat level of the electronic message;

identifying, if the threat level is below a threshold, one or more data elements of the plurality of data elements associated with a uniform resource locator (URL);

simulating the URL in an isolated environment to obtain a URL simulation;

comparing the URL simulation to the first set of contextual data to determine if the URL simulation matches the first set of contextual data; and blocking, if the URL simulation does not match the first set of contextual data, transmission of the electronic message to a user.

16. The method of claim 15, the method further comprising, prior to blocking the transmission of the electronic message:

transmitting, via the network interface, a notification comprising a summary of the first set of contextual data and the URL to the user; and allowing the transmission of the electronic message to the user.

17. The method of claim 15, wherein the AI model and the isolated environment are stored locally and integrated in one or more electronic message platforms.

18. The method of claim 15, the method further comprising, when simulating the URL;

executing the URL in the isolated environment to simulate the URL;

generating a second set of contextual data associated with the URL; and transmitting the second set of contextual data to the AI model.

19. The method of claim 18, the method further comprising, when comparing the URL simulation to the first set of contextual data:

comparing, via the AI model, the first set of contextual data with the second set of contextual data to generate a match measurement; and determining to block the electronic message if the match measurement is below a threshold.

20. The method of claim 15, the method further comprising:

causing a user device to display an interactable environment;

receiving a user interaction with the interactable environment to opt out of electronic message blocking;

after receiving the user interaction, receiving, via the network interface, another electronic message; and allowing, based on the user interaction, transmission of the other electronic message.

* * * * *